(12) United States Patent
Chen et al.

(10) Patent No.: US 9,725,061 B2
(45) Date of Patent: Aug. 8, 2017

(54) AUTOMATIC PASSENGER AIRBAG SWITCH

(71) Applicant: THUNDER POWER NEW ENERGY VEHICLE DEVELOPMENT COMPANY LIMITED, Central (HK)

(72) Inventors: Yong-Syuan Chen, New Taipei (TW); Jen-Chieh Hsiao, Taipei (TW)

(73) Assignee: THUNDER POWER NEW ENERGY VEHICLE DEVELOPMENT COMPANY LIMITED, Central (HK)

( * ) Notice: Subject to any disclaimer, the term of this patent is extended or adjusted under 35 U.S.C. 154(b) by 0 days.

(21) Appl. No.: 14/967,388

(22) Filed: Dec. 14, 2015

(65) Prior Publication Data
US 2017/0129436 A1 May 11, 2017

Related U.S. Application Data

(63) Continuation of application No. 14/935,443, filed on Nov. 8, 2015.

(51) Int. Cl.
*B60R 21/015* (2006.01)
*B60R 21/16* (2006.01)
(Continued)

(52) U.S. Cl.
CPC .......... *B60R 21/01512* (2014.10); *B60R 1/00* (2013.01); *B60R 21/01516* (2014.10);
(Continued)

(58) Field of Classification Search
CPC ............ B60R 2021/01204–2021/01211; B60R 2021/01245;
(Continued)

(56) References Cited

U.S. PATENT DOCUMENTS 4,645,233 A * 2/1987 Bruse ..................... B60N 2/002 280/753
5,482,314 A * 1/1996 Corrado ................. B60N 2/002 280/735

(Continued)

OTHER PUBLICATIONS

U.S. Appl. No. 14/935,443, filed Nov. 8, 2015, Non Final Office Action mailed Feb. 25, 2016, all pages.
(Continued)

*Primary Examiner* — Bao Long T Nguyen
(74) *Attorney, Agent, or Firm* — Kilpatrick Townsend & Stockton LLP

(57) ABSTRACT

Techniques described herein include a system and method for switching an airbag on or off based on determining that an object situated in a vehicle seat meets one or more conditions. In some embodiments, the vehicle seat may be fitted with a weight sensor configured to detect an object situated in the vehicle seat. The system may include a camera device configured to capture image information associated with the object situated in the vehicle seat. The image information may be processed to determine if the object is a person meeting one or more threshold conditions for activating the airbag. Upon processing the image information, the airbag may be provided with instructions to either activate or deactivate.

9 Claims, 5 Drawing Sheets

(51) Int. Cl.
*G06K 9/00* (2006.01)
*B60R 1/00* (2006.01)

(52) U.S. Cl.
CPC ........ *B60R 21/01538* (2014.10); *B60R 21/16* (2013.01); *G06K 9/00838* (2013.01); *B60R 2300/8006* (2013.01)

(58) Field of Classification Search
CPC ............ B60R 2021/01286–2021/01293; B60R 21/015; B60R 21/01512–21/01526; B60R 21/0153; B60R 21/01538; B60R 21/01552; B60N 2/002; G06K 9/00221; G06K 9/00268; G06K 2009/00322; G06K 9/00362
USPC .......... 701/36, 45, 48, 34.4; 280/728.1, 734, 280/735; 296/1.04; 382/106, 154
See application file for complete search history.

(56) References Cited

U.S. PATENT DOCUMENTS

| | | | | |
|---|---|---|---|---|
| 5,612,876 | A * | 3/1997 | Zeidler | B60N 2/002 180/273 |
| 5,653,462 | A * | 8/1997 | Breed | B60N 2/002 180/272 |
| 5,739,757 | A * | 4/1998 | Gioutsos | B60K 28/04 177/144 |
| 5,873,599 | A | 2/1999 | Bauer | |
| 5,927,752 | A * | 7/1999 | Brandin | B60R 21/01534 280/735 |
| 6,005,958 | A * | 12/1999 | Farmer | B60N 2/002 340/438 |
| 6,026,340 | A | 2/2000 | Corrado | |
| 6,113,137 | A * | 9/2000 | Mizutani | G01S 7/4802 280/734 |
| 6,116,638 | A * | 9/2000 | Hosoda | B60N 2/002 180/271 |
| 6,378,899 | B1 * | 4/2002 | Fujimoto | B60R 21/01566 280/735 |
| 6,422,598 | B1 * | 7/2002 | Yasui | B60R 21/01556 280/735 |
| 6,441,363 | B1 * | 8/2002 | Cook, Jr. | G01S 7/4802 180/273 |
| 6,480,616 | B1 * | 11/2002 | Hata | B60N 2/002 280/735 |
| 6,801,662 | B1 * | 10/2004 | Owechko | G06K 9/00201 382/103 |
| 6,904,347 | B1 * | 6/2005 | Berenz | B60R 21/01534 180/271 |
| 6,961,443 | B2 * | 11/2005 | Mahbub | G01S 7/4802 280/735 |
| 7,029,031 | B2 * | 4/2006 | Moisel | G01V 8/20 250/221 |
| 7,164,117 | B2 * | 1/2007 | Breed | B60R 21/01516 250/208.1 |
| 7,819,421 | B2 * | 10/2010 | Naito | B60R 21/23138 280/730.2 |
| 9,446,730 | B1 | 9/2016 | Chen et al. | |
| 2002/0070538 | A1 * | 6/2002 | Yasui | B60R 21/01556 280/735 |
| 2003/0079929 | A1 | 5/2003 | Takagi | |
| 2003/0081814 | A1 * | 5/2003 | Takagi | G06T 7/004 382/104 |
| 2003/0218319 | A1 * | 11/2003 | Amamori | B60R 21/23 280/729 |
| 2004/0153229 | A1 * | 8/2004 | Gokturk | G06K 9/00362 701/45 |
| 2006/0208169 | A1 * | 9/2006 | Breed | B60N 2/002 250/221 |
| 2007/0096445 | A1 * | 5/2007 | Breed | B60N 2/002 280/735 |
| 2007/0116327 | A1 * | 5/2007 | Breed | B60N 2/002 382/100 |
| 2007/0135982 | A1 * | 6/2007 | Breed | B60J 10/00 701/36 |
| 2010/0007726 | A1 * | 1/2010 | Barbieri | G06K 9/00221 348/78 |
| 2010/0086178 | A1 * | 4/2010 | Allen | B60Q 3/008 382/104 |
| 2012/0018989 | A1 * | 1/2012 | Breed | B60R 21/01516 280/735 |
| 2014/0291523 | A1 * | 10/2014 | Kwon | B60N 2/4805 250/341.7 |

OTHER PUBLICATIONS

U.S. Appl. No. 14/935,443, filed Nov. 8, 2015, Notice of Allowance mailed May 18, 2016, all pages.

* cited by examiner

AUTOMATIC PASSENGER AIRBAG SWITCH

CROSS-REFERENCES TO RELATED APPLICATIONS

The present application is a continuation of Non-Provisional U.S. application Ser. No. 14/935,443, filed Nov. 8, 2015, the disclosure of which is hereby incorporated by reference in its entirety for all purposes.

BACKGROUND

Although an airbag system can often save an adult's life, it can cause serious damage, or even death, to a small child or infant. When traveling with a small child or infant, a driver may wish to turn on or off a passenger seat airbag. Manual airbag systems are problematic for a number of reasons. For example, a driver may not know how to turn the airbag system on or off. Additionally, the driver may forget to reactivate the airbag system upon removing the small child, which might result in the death of an adult riding in the passenger seat.

Traditional automatic airbag deployment systems have relied heavily upon pressure sensors to determine whether an airbag should be activated for a passenger seat. However, these systems are unreliable, and inherently unsafe, because the driver may place additional objects in the passenger seat along with a child. The additional weight may be enough to activate the passenger seat airbag in these traditional automatic airbag systems and can cause serious harm, or even death, to the child in the passenger seat in the event of an accident.

SUMMARY

The present disclosure solves these and other problems with the current technology. In particular, the disclosure provides an improved automatic airbag deployment system in which the airbag deployment device is activated or deactivated upon determining that an object situated in a vehicle seat is a person meeting one or more criteria. To do this, the automatic airbag deployment system described includes a number of sensors configured to detect various attributes of an object situated in the vehicle seat. Each of the sensors may be activated sequentially or simultaneously to gather input related to the object that may be processed by a processor device. In some embodiments, the processor device receives digital image input from a camera sensor device, which may be processed, using one or more image processing techniques, to determine whether the object is a person meeting the one or more criteria.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include an airbag deployment system configured to automatically activate and deactivate an airbag deployment device based on whether particular conditions are met. In some embodiments, the airbag deployment system may detect that a weight threshold has been met by an object or person situated in vehicle's passenger seat. In some embodiments, the airbag deployment system may include a height detection device configured to determine whether the height of the object or person situated in vehicle's passenger seat meets a threshold height. In some embodiments, the airbag deployment system may utilize one or more facial recognition techniques to determine an identity of a person in the passenger seat. The person's identity may be used to apply one or more personal configuration settings to the airbag deployment system.

In accordance with at least some embodiments, an airbag deployment system may be configured to activate a passenger airbag deployment device only when a person seated in the passenger seat meets certain criteria. The airbag deployment system may include a number of sensors designed to detect whether an object situated in the passenger seat of a vehicle is a person. In addition, the airbag deployment system may include a number of sensors configured to detect a weight, height, and/or age of the person seated in the passenger seat. The airbag deployment system may be configured to make a determination regarding an object positioned in the vehicle seat upon detecting an initialization event (e.g., a startup of the car's engine, buckling of a safety belt, closing of a door, etc.). For example, a weight or pressure applied to the vehicle seat may constitute an initialization event that triggers one or more of the described processes. If the passenger seat is not occupied by a person, or that person does not meet the weight, height, and/or age requirements, then the airbag deployment device may be shut off or deactivated.

In some embodiments, the verification process to determine whether a person meets the criteria for activating the airbag deployment device may be initiated by the airbag deployment system upon detecting a pressure or weight in the passenger seat. The weight of the passenger may be detected through the use of a weight or pressure sensor.

Figure 1:
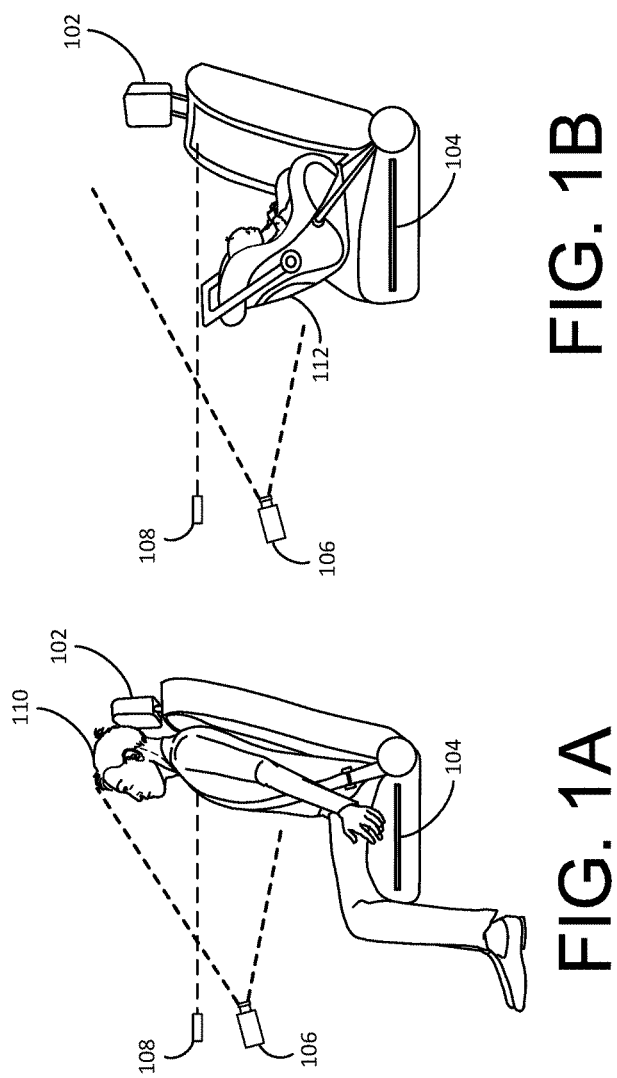
FIGS. 1A and 1B depict an illustrative example of an airbag deployment system in accordance with at least some embodiments.

FIG. 1 depicts an illustrative example of an airbag deployment system in accordance with at least some embodiments. In order to better illustrate embodiments of the disclosure, FIG. 1 has been divided into FIG. 1A and FIG. 1B. In FIG. 1, a vehicle seat 102 of an airbag deployment system is depicted as having a pressure sensor 104. In some embodiments, the airbag deployment system may include a camera device 106 and/or a height detection device 108.

The pressure sensor 104 may be any device or sensor configured to detect a total amount of pressure applied to the vehicle seat 102. In some embodiments, the pressure sensor 104 may be a load cell (e.g., a hydraulic load cell, a strain gauge load cell, or a pneumatic load cell). In some embodiments, the airbag deployment system may include a processor device that compares an indication of the pressure detected by the pressure sensor against a pre-programmed threshold pressure. In some embodiments, the pressure sensor may be hard wired to provide a signal only if the pressure detected is greater than a predetermined threshold. For example, a load cell may be wired in series with a comparator circuit, such that a signal will be generated by the comparator circuit if a signal received from the load cell exceeds a threshold signal provided to the comparator circuit.

The camera device 106 may be any device configured to capture image information associated with an object in the vehicle seat 102. For example, the camera device 106 may be a digital camera. In some embodiments, the camera device 106 may be configured to capture video or a series of images. In some embodiments, the camera device 106 may be configured to capture images on a periodic basis. Image information captured by camera device 106 may be processed by a processing device, which will be described in greater detail below. The processing device may determine, from the image information captured by the camera 106, a location of at least one eye structure in the image information.

The height detection device 108 may be any device configured to determine whether the height of an object or person situated in the vehicle seat 102 is greater than a threshold height. In some embodiments, the height detection device 108 may include one or more pyroelectric sensors capable of detecting infrared rays emitted by the human body. For example, the pyroelectric sensors may be installed on the ceiling of the vehicle to detect the height of the object (and whether the object is a person) by determining a distance of the object from the ceiling. In some embodiments, the height detection device 108 may comprise a light beam emitted across a space occupied by an object in the vehicle seat 102 at the height threshold. If the light beam is obstructed, then the height sensor 108 may determine that the height threshold has been met. In some embodiments, the camera device 106 may also be the height detection device 108. For example, one or more image processing techniques may be used to determine a person's height from an image of the person captured by the camera device 108.

In accordance with at least some embodiments, when the pressure sensor 104 detects that an object has been situated in vehicle seat 102, the camera device 106 may be activated. As depicted in FIG. 1A, the camera device 106 is able to capture images of a face belonging to a person 110 seated in vehicle seat 102. In some embodiments, the image of the face of person 110 may be processed using one or more facial recognition techniques to determine whether the airbag deployment device should be activated or deactivated. Alternatively, as depicted in FIG. 1B, if a car seat or other object is placed in the vehicle seat 102, the airbag deployment device may be deactivated.

Figure 2:
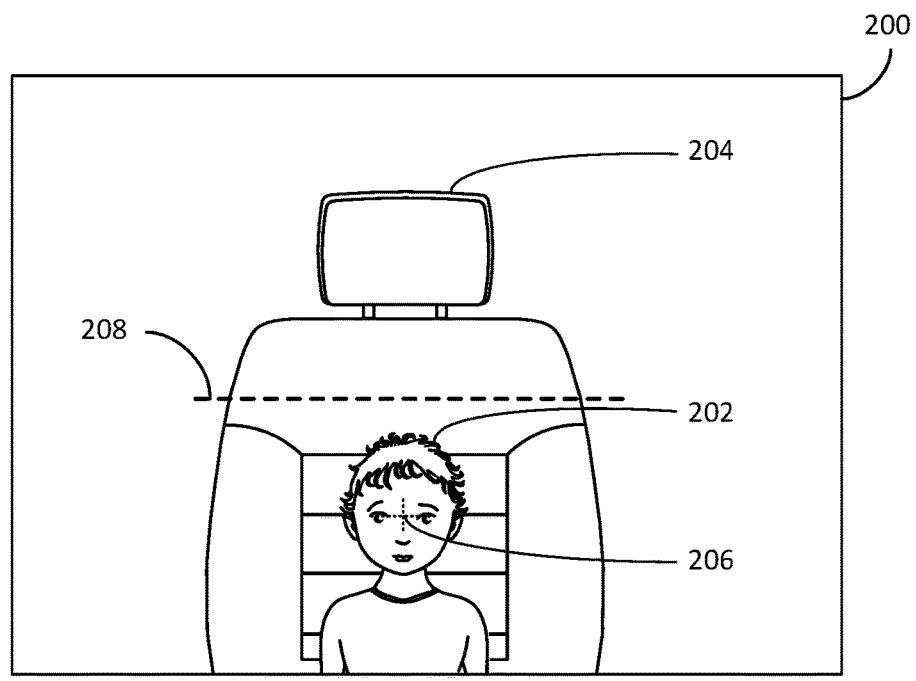
FIG. 2 depicts an illustrative example image processing technique in accordance with at least some embodiments.

FIG. 2 depicts an illustrative example image processing technique in accordance with at least some embodiments. In FIG. 2, an image 200 is presented that depicts a person 202 seated in a vehicle seat 204. Image 200 may be an image captured by the camera device 108 depicted in FIG. 1. In some embodiments, the image processor may be configured to determine a location of an eye or eyes 206 associated with a person 202 within the image. The location of the eye or eyes 206 may be utilized by a processor device to determine whether the person 202 is of sufficient height that the airbag deployment device of the airbag system should be activated. For example, the processor device may be configured to determine whether the eye location 206 is above a height threshold 208. Upon determining that the eye location 206 is below a threshold height 208 in image 200, the airbag deployment device may be deactivated.

In some embodiments, an image processor may be configured to detect facial data information from the image 200. The facial data information from the image may be used to identify the person 202. For example, the facial data information may be compared to stored facial data information (either locally or at a remote server) in order to determine the identity of the person 202. In some embodiments, the person 202 may be associated with an account or configuration settings stored at a remote server. The configuration settings may include an indication of the person's age and/or airbag activation settings. For example, an image 200 captured by the airbag system may depict Johnny Child (a person 202). The image information may be processed, using one or more facial recognition techniques, to determine that the image is related to Johnny Child. Once Johnny Child has been identified, a profile for Johnny Child may be retrieved from a profile data store to determine that Johnny Child's age is 8. For example, the processor device may compare Johnny Child's birthdate (as stored in his profile information) to today's date. The processor device may then determine that the age of 8 is below an age threshold for activating the airbag deployment device of the airbag system, and may subsequently deactivate the airbag deployment device. In some embodiments, Johnny Child's profile information may include an indication that Johnny Child suffers from a medical condition that makes airbag deployment dangerous. The airbag deployment device may be deactivated in response to making that determination as well.

Figure 3:
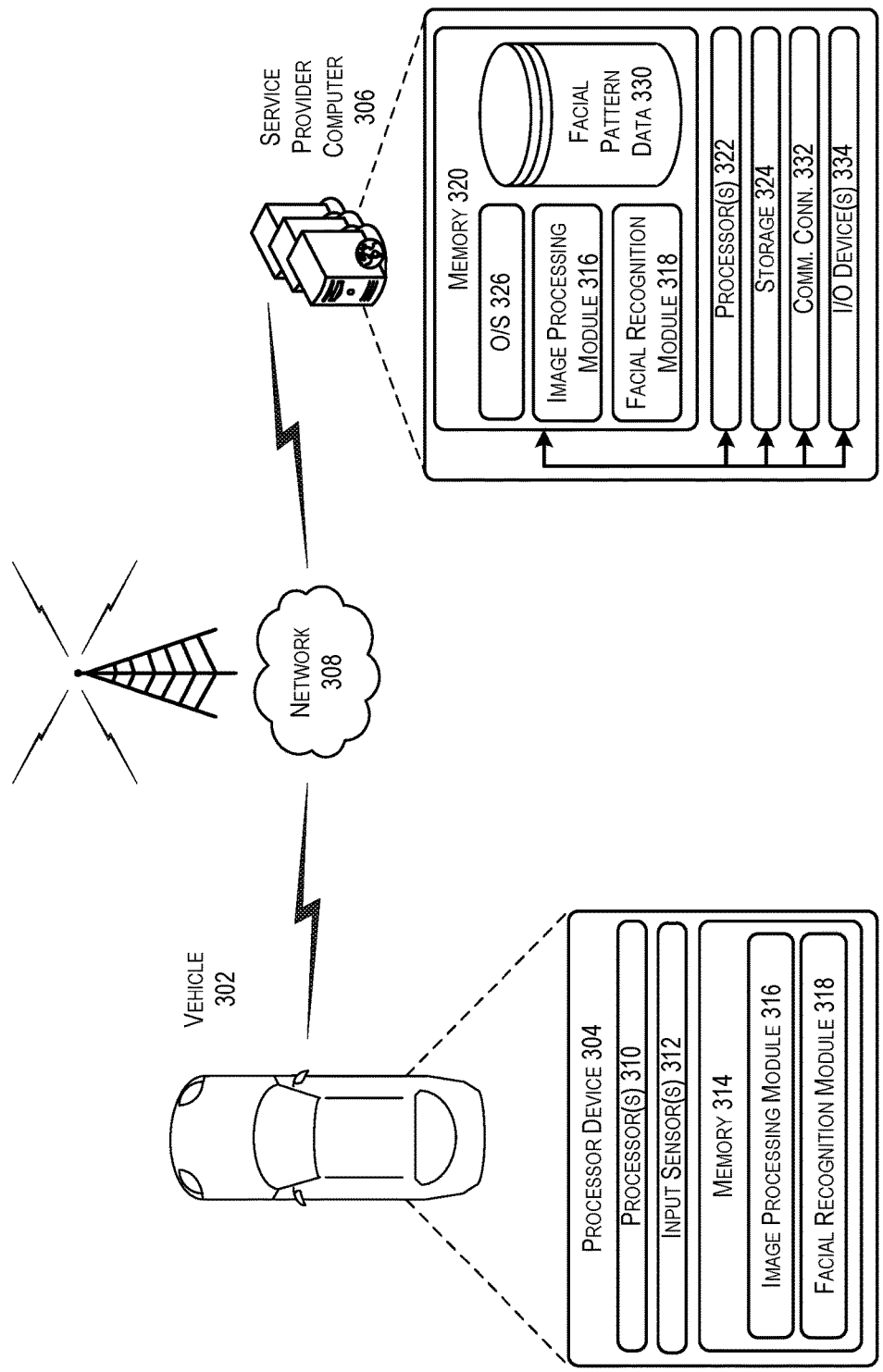
FIG. 3 depicts system or architecture in which techniques for processing image information and activating/deactivating an airbag deployment device may be implemented in accordance with the disclosure.

FIG. 3 depicts system or architecture in which techniques for processing image information and activating/deactivating an airbag deployment device may be implemented in accordance with the disclosure. In some examples, a vehicle 302 may include a processor device 304. In some embodiments, the processor device 304 may be configured to communicate with a service provider computer 306 via a network 308, or via other network connections. The processor device 304 or the service provider computer 306 may be configured to process an image received from a camera associated with the airbag deployment system and provide instructions for turning on or off the airbag deployment device.

The processor device 304 may be any type of computing device capable of performing the described functions. The processor device 304 may include one or more processors 310 capable of processing input from one or more input sensors 312. As is known in the art, there are a variety of input sensors 312 capable of detecting input related to a user or vehicle conditions, such as accelerometers, cameras, microphones, etc. The input obtained by the input sensors may be from a variety of data input types, including, but not limited to, audio data, visual data, or biometric data. Programmatic code for an application or module utilized in the implementation of at least some embodiments may be stored and executed from the memory 314 of processor device 304. The processor device 304 may include a module for processing image information to determine a viewer position (image processing module 316) and/or a module for implementing one or more facial recognition techniques (facial recognition module 318).

In some examples, the network(s) 308 may include any one or a combination of many different types of networks, such as cable networks, the Internet, wireless networks, cellular networks, and other private and/or public networks. It is also noted that the described techniques may apply in other client/server arrangements, as well as in non-client/server arrangements (e.g., locally stored applications, peer to-peer systems, etc.). In an exemplary embodiment, the processor device 304 may communicate with a network hub using one or more wireless communication networks (e.g., 3G, 4G, etc.). The network hub may, in turn, utilize a physical connection (e.g., copper cable, T1, Ethernet, etc.) to communicate with the service provider computer at a network address.

The service provider computer 306 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that, in some embodiments, the service provider computer 306 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service provider computer 306 may include at least one memory 320 and one or more processing units (or processor(s)) 322. The processor(s) 322 may be implemented as appropriate in hardware, computer-executable instructions, firmware or combinations thereof. Computer-executable instruction or firmware implementations of the processor(s) 322 may include computer-executable or machine executable instructions written in any suitable programming language to perform the various functions described.

The memory 320 may store program instructions that are loadable and executable on the processor(s)310 and/or processor(s) 322, as well as data generated during the execution of these programs. Depending on the configuration and type of service provider computer 306, the memory 320 may be volatile (such as random access memory (RAM)) and/or non-volatile (such as read-only memory (ROM), flash memory, etc.). The service provider computer 306 may also include additional storage 324, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 320 may include multiple different types of memory, such as static random access memory (SRAM), dynamic random access memory (DRAM) or ROM. Turning to the contents of the memory 320 in more detail, the memory 320 may include an operating system 326 and one or more application programs or services for implementing the features disclosed herein including at least a module for processing image information to determine a viewer position (image processing module 316) and/or a module for implementing one or more facial recognition techniques (facial recognition module 318. The memory 320 may also include pattern data 330, which provides data related to identifying portions of image information. In some embodiments, the pattern data 330 may be stored in a database.

The memory 320 and the additional storage 324, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the processor device 304 or the service provider computer 306. The service provider computer 306 may also contain communications connection(s) 330 that allow the service provider computer 306 to communicate with a stored database, another computing device or server, user terminals, and/or other devices on the network(s) 308. The service provider computer 306 may also include input/output (I/O) device(s) and/or ports 332, such as for enabling connection with a keyboard, a mouse, a pen, a voice input device, a touch input device, a display, speakers, a printer, etc.

Turning to the contents of the memory 320 in more detail, the memory 320 may include an operating system 326, a database containing pattern data 330 and the one or more application programs or services for implementing the features disclosed herein, including an image processing module 316 and/or a facial recognition module 318.

In some embodiments, the image processing module 316 may be configured to receive image information from one or more input sensors and identify a viewer position from the image information. The image processing module 316 may receive, as input, a digital image (or link to a digital image) and may provide, as output, a set of coordinates. The image processing module 316 may utilize one or more image processing techniques in order to identify image patterns within the received image that correspond to an eye or eyes. In the case that two eyes are identified, the image processing module 316 may output coordinates located halfway between both eyes. In the case that a single eye is identified, the image processing module 316 may output the coordinates of the identified eye. In the case that more than two eyes are identified, the image processing module 316 may return an error or determine the set of eyes that are most likely correct. For example, the image processing module 316 may determine a particular set of eyes is likely the correct set of eyes based on the position and/or orientation of each eye.

In some embodiments, the facial recognition module 318 may be configured to receive image information from one or more input sensors and identify a person from the image information. Once the person has been identified, a profile for that person may be retrieved from a profile data store to determine the person's age. The processor device 304 or service provider computer 306 may then determine whether the person's age is below an age threshold for activating the airbag deployment device of the airbag system, and may subsequently transmit a signal to activate or deactivate the airbag deployment device based on this determination. In some embodiments, the person's profile information may include an indication that the person suffers from a medical condition that makes airbag deployment dangerous. The processor device 304 or service provider computer 306 may also transmit a signal to activate or deactivate the airbag deployment device based on this determination.

Although described as being executed from the memory 320 of the service provider computer 306, the image processing module 316 and/or the facial recognition module 318 may be located on, and executed from, the memory 314 of the processor device 304. In embodiments in which one or more of the modules are located on the service provider computer 306, the instructions for activating or deactivating the airbag deployment device may be transmitted to the vehicle and executed by the airbag deployment system.

Figure 4:
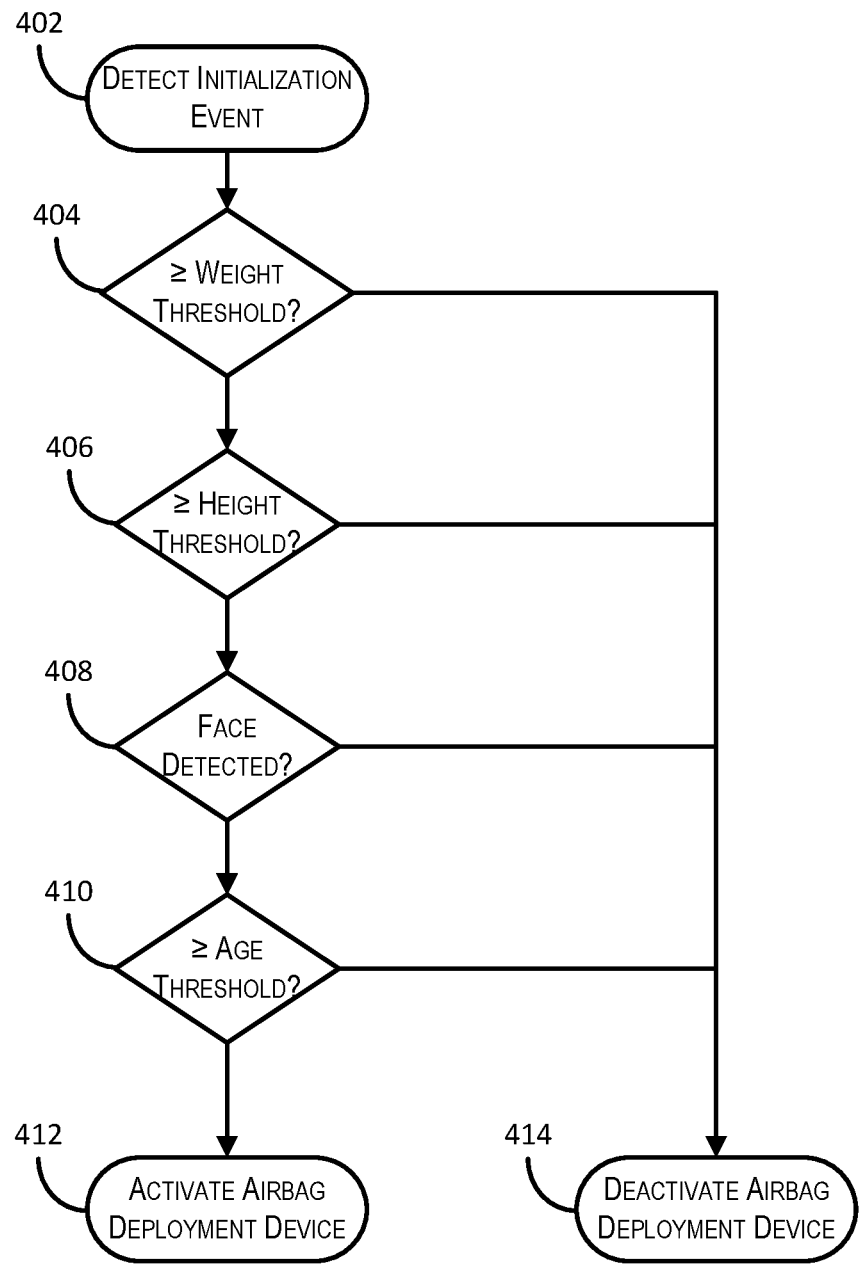
FIG. 4 depicts an illustrative flow chart demonstrating an example automatic airbag deployment system on/off switch in accordance with at least some embodiments.

FIG. 4 depicts an illustrative flow chart demonstrating an example automatic airbag deployment system on/off switch in accordance with at least some embodiments. The process 400 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 400 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 400 of FIG. 4 may be performed by at least the one or more service provider computers 306 and/or the processor device 304 shown in FIG. 3. The code may be stored on a computer-readable storage medium, for example, in the form of a computer program including a plurality of instructions executable by one or more processors. The computer-readable storage medium may be non-transitory.

Process 400 may begin at 402, when an initialization event is detected. For example, the process 400 may detect a startup of the car's engine, a buckling of a safety belt, a closing of a door, or the activation of a weight sensor in a vehicle seat. Upon detecting the initialization event, the process 400 may determine whether the object situated in the vehicle seat is a person meeting each of the threshold requirements to activate the airbag deployment device. It should be noted that although some orders for performing the activation threshold comparisons described will make more logical sense than others, each of the following activation threshold comparisons may be made in any order. Additionally, it should be noted that some embodiments of the disclosure will not include every activation threshold comparison described with respect to FIG. 4.

In some embodiments, the process 400 may compare the weight of the object placed into the vehicle seat against a threshold weight at 404. In some embodiments, activation threshold comparison 404 of the process 400 may be performed using a weight sensor, or a pressure sensor. For example, one or more load cells located in the vehicle seat may produce an electrical signal whose magnitude is directly proportional to the pressure applied to the vehicle seat. In some embodiments, the electrical signal may be provided to a comparator circuit to determine whether the electrical signal is greater than a threshold signal. In some embodiments, the magnitude of the electrical signal may be compared to a threshold value by the processor device. If the magnitude of the electrical signal is greater than the threshold value, then the process 400 may determine that the weight activation threshold comparison is a success.

In some embodiments, the process 400 may compare the height of the object placed into the vehicle seat against a threshold height at 406. In some embodiments, activation threshold comparison 406 of the process 400 may be performed using any device configured to detect a height of an object. In some embodiments, the process 400 may utilize a pyroelectric sensor, or other sensor, capable of detecting infrared rays emitted from a living body. In some cases, the pyroelectric sensors may be installed on the ceiling of the vehicle to detect the height of the object by determining a distance of the object from the ceiling. In some embodiments, the process 400 may utilize a light beam emitted across a space occupied by an object in the vehicle seat at the height threshold. If the light beam is obstructed, then the process 400 may determine that the height threshold has been met. In some embodiments, the process 400 may utilize a camera device to capture image information related to the object in the vehicle seat. A processor device may utilize one or more image processing techniques to determine the height of the object based on the image information. If the height of the object is met or exceeded, then the process 400 may determine that the height activation threshold comparison is a success.

In some embodiments, the process 400 may attempt to detect a face from image information captured with respect to the object situated in the vehicle seat at 408. In some embodiments, the process 400 may utilize a camera device to capture image information related to the object in the vehicle seat. A processor device may utilize one or more facial recognition techniques to identify a facial structure in the captured image information. In some embodiments, the process 400 may identify the person based on data produced using the facial recognition technique. In some embodiments, the process 400 may only determine if a face is present in the captured image, and may not attempt to determine an identity of the person in the image. If the process 400 detects a face, then the process 400 may determine that the object situated in the vehicle seat is a person and may consider the activation threshold at 408 a success.

In some embodiments, the process 400 may compare the age of the person situated in the vehicle seat against a threshold age at 410. In some embodiments, the processor device may use one or more facial recognition techniques to determine an age of a person seated in the vehicle seat. In some embodiments, the process 400 may determine an identity of the person seated in the vehicle seat and may identify a user profile associated with that person. The user profile may include one or more details related to the person, including an indication of the person's age or date of birth. The profile data may be used to determine whether the person seated in the vehicle seat passes an age activation threshold comparison.

In some embodiments, a personal profile may include an indication of whether or not to activate an airbag deployment device of the airbag deployment system. For example, even if a person meets or exceeds each of the activation threshold comparisons presented in process 400, the airbag deployment device may still be deactivated if the profile information includes a configuration setting to deactivate the airbag deployment device. For example, the person may have a medical condition that makes deployment of an airbag dangerous. The person's profile may therefore indicate that the airbag is to be deactivated. Upon identifying the person, using facial recognition techniques, the airbag deployment system may access the person's profile and subsequently deactivate the airbag deployment device in response to determining that the airbag should not be deployed.

Once each of the activation threshold comparisons has been met, an airbag deployment device may be activated, or turned on, at 412. If one or more of the activation threshold comparisons have been failed, then it may be unsafe or unnecessary to activate the airbag deployment device. In that case, the airbag deployment device may be deactivated, or turned off, at 414. It should be noted that the airbag deployment device may be placed in either an activated state or a deactivated state as a default state. For example, the airbag deployment device may begin in a deactivated state. In this example, the airbag deployment device may be activated only upon each of the activation threshold comparisons of process 400 successfully being made. In another example, the airbag deployment device may begin in an activated state. As each of the activation threshold comparisons of process 400 are made, the process may deactivate the airbag deployment device upon any of the activation threshold comparisons being unsuccessful.

Figure 5:
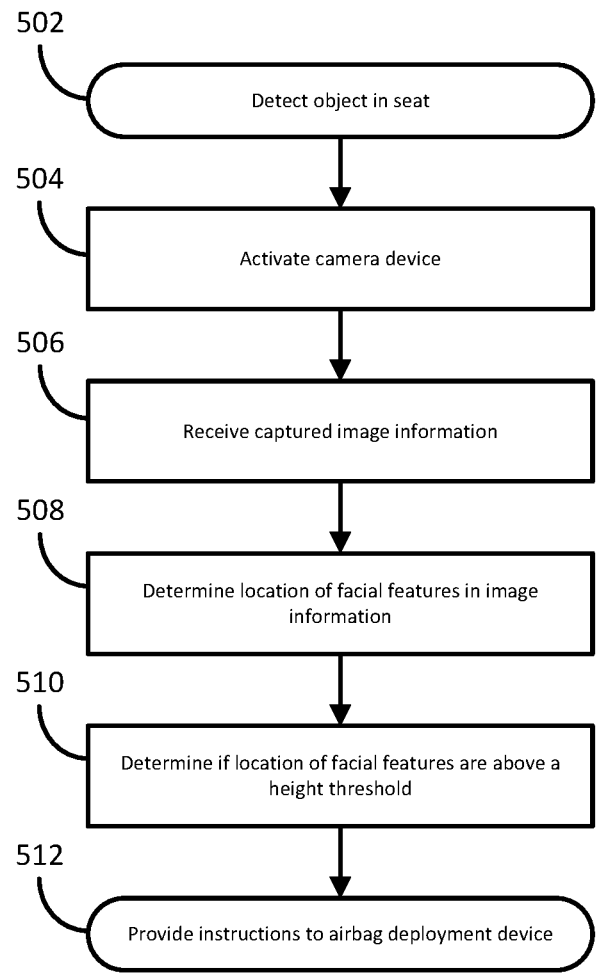
FIG. 5 depicts an illustrative flow chart demonstrating an example process for providing instructions to an airbag deployment device in accordance with at least some embodiments.

FIG. 5 depicts an illustrative flow chart demonstrating an example process for providing instructions to an airbag deployment device in accordance with at least some embodiments. The process 500 is illustrated as a logical flow diagram, each operation of which represents a sequence of operations that can be implemented in hardware, computer instructions, or a combination thereof In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 500 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 500 of FIG. 5 may be performed by at least the one or more service provider computers 306 and/or the processor device 304 shown in FIG. 3. The code may be stored on a computer-readable storage medium, for example, in the form of a computer program including a plurality of instructions executable by one or more processors. The computer-readable storage medium may be non-transitory.

Process 500 may begin at 502, when an object is detected as being situated in a vehicle seat. In some embodiments, the object may be detecting using one or more weight sensors attached to the vehicle seat. For example, the process may determine that a weight of the object is above a threshold weight. In some embodiments, the object may be detected when a seatbelt for the vehicle seat is buckled, or the vehicle seat is adjusted. Upon detecting that an object is in the vehicle seat, one or more camera devices may be activated at 504. The camera device, in response to receiving the signal to become active, may capture image information related to the object in the seat. For example, the camera device may take a picture of the object. The image information may then be provided to the service provider computer and/or the processor device.

Once the image information is received from the camera device at 506, it may be processed using one or more image processing techniques. For example, the process 500 may utilize a facial recognition technique to identify one or more structures in the image information that matches an eye pattern structure in a data store. If the process 500 is unable to identify at least one facial feature, then the process 500 may determine that the object situated in the vehicle seat is not a person. Otherwise, the process 500 may identify at least one facial feature of the object from the image information and the location of that facial feature at 508. The process 500 may subsequently determine whether the location of the facial feature in the image information is above a height threshold at 510. For example, the camera device may be fixed in a particular location, such that an image captured by the camera device may be associated with a coordinate grid. In this example, the location of the at least one facial feature may be mapped to an x and y coordinate value. The process may determine whether they value (a vertical position) of the mapped coordinates is greater than a value associated with the threshold value. By way of illustration, consider a scenario in which an eye pattern in an image is detected at location (0, 12) and the threshold height value is associated with the function y=15 (a horizontal line located at the vertical position 15). In this scenario, the location of the eye pattern falls below the threshold height because 12 is less than 15.

Once the image information has been processed, the process 500 may provide instructions to the airbag deployment device at 512. If the process has determined that the image information fails to meet at least one condition (e.g., the weight of the object is below a threshold weight, no facial feature is detect in the image information, the location of a detected facial feature is below a height threshold, etc.), then the airbag deployment device may be provided with instructions to deactivate, or turn off. Otherwise, the airbag deployment device may be provided with instructions to activate, or turn on.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An airbag deployment apparatus, comprising:
   an airbag deployment device configured to deploy an airbag in a collision event;
   a sensor device configured to detect an object situated in a vehicle seat;
   an optical sensor having an emitting portion positioned in front of the vehicle seat at a vertical height less than a maximum vertical height of the vehicle seat, the emitting portion of the optical sensor facing the vehicle seat and the optical sensor being configured to detect height information related to the object situated in the vehicle seat, wherein the emitting portion of the optical sensor emits a light beam over the vehicle seat at a height that corresponds to a height threshold, and wherein the light beam is parallel with a base of the vehicle seat; and
   a processor device configured to activate the airbag deployment device upon determining, from the optical sensor, that the object situated in the vehicle seat obstructs the light beam emitted over the vehicle seat.

2. The airbag deployment apparatus of claim 1, wherein the sensor device is a pressure sensor.

3. A method of activating and deactivating an airbag deployment device, comprising:
   detecting an object situated in a vehicle seat;
   activating an optical sensor having an emitting portion positioned in front of the vehicle seat at a vertical height less than a maximum vertical height of the vehicle seat, the emitting portion of the optical sensor facing the vehicle seat and the optical sensor being configured to detect height information related to the object situated in the vehicle seat, wherein the emitting portion of the optical sensor emits a light beam over the vehicle seat at a height that corresponds to a height threshold, and wherein the light beam is parallel with a base of the vehicle seat;
   receiving information from the optical sensor related to whether the light beam emitted over the vehicle seat is obstructed; and
   providing activation instructions to the airbag deployment device, based at least in part on whether the light beam emitted over the vehicle seat is obstructed.

4. The method of claim 3, wherein providing activation instructions to the airbag deployment device comprises at least one of:
   upon determining that the light beam emitted over the vehicle seat is obstructed, activating the airbag deployment device; and
   upon determining that the light beam emitted over the vehicle seat is not obstructed, deactivating the airbag deployment device.

5. The method of claim 3, wherein the object is detected as being situated in the vehicle seat using a weight sensor.

6. A vehicle airbag system, comprising:
   a vehicle seat equipped with one or more weight sensors;
   an airbag deployment device configured to deploy an airbag to the vehicle seat;
   an optical sensor having an emitting portion positioned in front of the vehicle seat at a vertical height less than a maximum vertical height of the vehicle seat, the emitting portion of the optical sensor facing the vehicle seat and the optical sensor being configured to detect height information related to an object situated in the vehicle seat, wherein the emitting portion of the optical sensor emits a light beam over the vehicle seat at a height that corresponds to a height threshold, and wherein the light beam is parallel with a base of the vehicle seat;
   a processor device; and
   a memory including instructions that, when executed by the processor device, cause the vehicle airbag system to, at least:
      receive information from the optical sensor related to whether the light beam emitted over the vehicle seat is obstructed; and
      provide activation instructions to the airbag deployment device, based at least in part on whether the light beam emitted over the vehicle seat is obstructed.

7. The vehicle airbag system of claim 6, wherein the instructions further cause the vehicle airbag system to access a user profile related to the person situated in the vehicle seat, the user profile including data related to the person situated in the vehicle seat.

8. The vehicle airbag system of claim 7, wherein the user profile is associated with one or more configuration settings, wherein the instructions to the airbag deployment device are provided based at least in part on the one or more configuration settings.

9. The vehicle airbag system of claim 8, wherein the one or more configuration settings includes data related to at least one of an age or a medical condition.

\* \* \* \* \*